Jan. 21, 1964 J. C. BUIE 3,118,472
ROTO-CHANGE ORIFICE FITTING
Filed May 7, 1962 3 Sheets-Sheet 1

Jan. 21, 1964 J. C. BUIE 3,118,472
ROTO-CHANGE ORIFICE FITTING
Filed May 7, 1962 3 Sheets-Sheet 3

Patented Jan. 21, 1964

3,118,472
ROTO-CHANGE ORIFICE FITTING
John C. Buie, 11418 72 Ave., Edmonton, Alberta, Canada
Filed May 7, 1962, Ser. No. 193,367
3 Claims. (Cl. 138—40)

The present invention relates to an orifice plate quick-change holder, and is adapted to be installed in a flow pipe line carrying fluids, either liquids or gas, and this device is associated with a metering system used on such flow lines, but the present invention is restricted to an orifice plate carrier and associated housing, so that the metering system is not illustrated or described.

In present practice it may be found necessary to change the orifice plates in use on a flow line, and it is necessary to shut down the flow line while this change is being effected. It will be readily understood that such delays are costly and impair the efficiency of the installation of which the orifice plate carrier forms a part.

The problem with which I was confronted was to accurately center an orifice plate in a flow line for fluids, and also to effect the change of the orifice plate in the flow line with safety and without interrupting the flow of fluid through the pipe line during the period of changing the orifice plate or plates.

To accomplish such a result I found that it was necessary to comply with or to fulfill certain objects before my problem could be satisfactorily solved.

One of the objects of my invention is to provide complementary orifice plates and to so arrange them with relation to the flow pipe that an orifice plate will always be in operative axially aligned position in the flow line during the period when the changing of the orifice plate or plates is being carried out.

Another object of my invention is to mount the carrier for the orifice plates in a plane transversely arranged across the pipe line and to permit of the carrier being rotated in this plane to position the orifice plate in alignment with the flow line.

A further object of my invention is to permit the orifice plate carrier being rotated through a prescribed semi-circle or major arc of a circle to bring the orifice plates into desired position when it is found necessary to change the orifice plate or plates, and to permit of such changing of the orifice plates being carried out in sequence without shutting down the pipe line.

Still another object of my invention is to provide for the precision aligning of the orifice plates with the pipe line when installing or after changing an orifice plate and without shutting down or interfering with the flow of fluid through the pipe line.

A further object still of my invention is to provide means for equalizing the pressure on the opposite faces of the orifice plates and/or the carrier, so that the carrier may be rotated into the desired position during such changing without being subjected to an unbalanced fluid pressure on the opposite sides of the plate.

Still a further object of my invention is to provide means located externally of the pipe line whereby the carrier and the orifice plate may be rotated either manually or by motor into the desired position prior to and subsequent to an orifice plate changing operation.

Other objects of my invention will be made clear as the specification develops.

So that the nature of my invention will be clearly understood, I have illustrated an embodiment of the same which I will describe in detail, but I wish it to be understood that I do not limit my invention to this specific form illustrated and described, but reserve the right to alter the structural arrangements of the device within the scope of my appended claims, and without departing from the spirit of my invention.

In the drawings:
FIGURE 1 is an end elevation of the housing carrying the orifice plates, part of the flange of the delivery conduit being cut away for the sake of clarity to show the lever for operating the carrier also the stops designed to co-act with the lever to limit the arc through which the lever may be operated and showing the access plate on the end of the housing, the stops being formed eccentric to enable the operator to correct plate alignment in case of wear.

Figure 5:
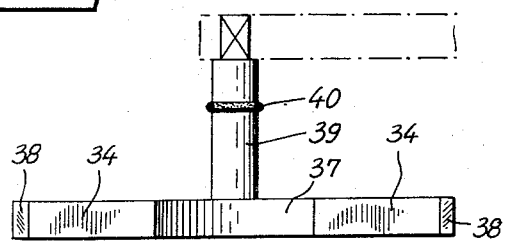
Figure 6:
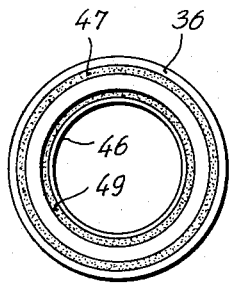
Figure 8:
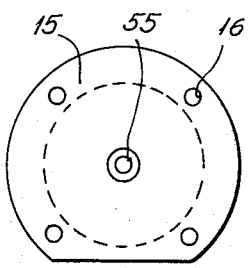
Figure 10:
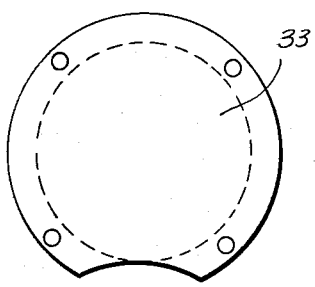
Figure 7:
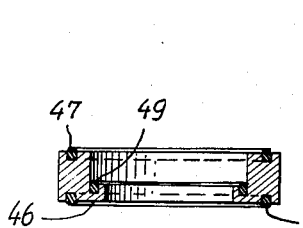
Figure 9:
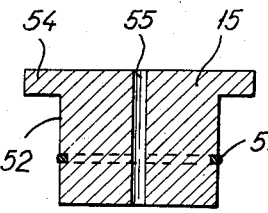
Figure 11:
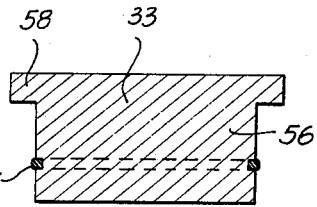
Figure 12:
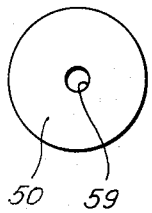
Figure 13:
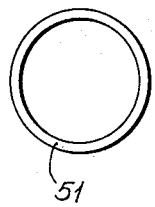
Figure 14:
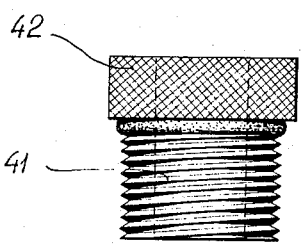

FIGURE 5 is a view of the carrier looking downwardly.
FIGURE 6 is a plan view of an orifice plate holder.
FIGURE 7 is a section of the same.
FIGURE 8 is a front elevation of an access plate, and showing the central orifice therethrough.
FIGURE 9 is a section of the same.
FIGURE 10 is a front view of the second access plate.
FIGURE 11 is a sectional view of the same.
FIGURE 12 is a front view of an orifice plate.
FIGURE 13 is a view of the orifice plate retaining ring.
FIGURE 14 is an elevation of a bushing for the carrier spindle.

Like characters of reference refer to like parts in the several drawings.

Referring to the drawings, A represents a cylindrical housing formed of two members 10 and 11 which are designed to be secured together by bolts or set screws 12, and a chamber 13 is concentrically located within the member 10, so that when these two members are in assembled position, the chamber 13 lies wholly within the confines of the housing.

The member 10 is formed with an access orifice 14 of appreciable diameter, which orifice extends from the outer face of the member 10 to the chamber 13, and this orifice is normally closed by a removable access plate or cover 15 which is removably secured to the outer face of the member 10 by set screws passing through the orifices 16 and threaded into the orifice 17 in the outer wall of the member 10.

A second orifice 18 is provided in the member 10 and is located diametrically opposite the access orifice 14, and the orifice 18 is formed on its peripheral wall with a shoulder 19 against which the conduit 20 abuts.

This conduit may be threaded into the member 10 or it may be formed integral therewith, and the outer end of this conduit may be formed with a flange 21, so constituting a means whereby the housing A may be secured to a pipe line.

As an alternative, the outer end of the conduit 20 may be attached by a threaded connector to the pipe line if such is found desirable.

Centrally disposed in the member 10 in an orifice 22 which is equidistantly spaced from the orifices 14 and 18 and the orifice 22 is enlarged as shown at 23 to form a radial shoulder 24 located intermediate of the length of the orifice and the outer end of this enlarged portion is recessed as shown at 25.

A pair of diverging equalizing line conduits 26 are provided which extend from the orifice 18 to the peripheral wall of the member 10, and a similar pair of diverging equalizing line conduits 26 are provided which extend from the orifice 28 to the peripheral wall of the member 11. The outer ends of these conduits 26 are threaded to facilitate connecting a meter with the housing A and thence through the conduits 26 with the orifices 18 and 20 to show the differential of pressure in the pipe line on opposite sides of the housing A.

This manner of connecting a meter with the diverging equalizing conduits 26 in the housing A is not illustrated since it does not form part of the invention but is merely referred to herein to explain the relation of such a meter with the housing A.

The inner face of the chamber 13 is undercut at the junction with its cylindrical peripheral wall and in the groove so formed a ring gasket 27 is inserted.

The member 11 is of disc-like shape and formed with an orifice 28 which extends therethrough, and this orifice is in axial alignment with the orifice 18 in the member 10 when the housing is assembled. A conduit 29 extends from and is secured to the inner periphery of the orifice 28 and the inner end of this conduit abuts the radial shoulder 30 formed on the inner periphery of the orifice 28.

This conduit 29 is formed at its outer end with a flange 31 similar to the flange 21 formed on the conduit 20 of the member 10.

Diametrically opposite the orifice 28 is a second orifice 32 which extends through the member 11 and this orifice 32 is in axial alignment with the orifice 14 in the member 10 when the housing A is assembled.

The orifice 32 is designed to be normally closed by an access plate 33 which is removably secured to the outer face of the member 11 by set screws or the like. The preferred form of the access plate 33 will be described later.

A carrier B is housed in the chamber 13 between the members 10 and 11 when the housing is assembled and this carrier may be constructed of a rectangular plate formed at its opposite ends with oppositely disposed arcuate arms 34 and 35 which embrace orifice plate holders 36, and the longitudinal walls of this plate may be formed with cut-out portions 37 so that the plate is relatively light in weight and easily rotated on a central axis as will be explained hereafter.

The four corners 38 of the carrier B are formed arcuate and slidably fit or engage with the peripheral wall of the chamber 13, and the carrier plate is formed with a spindle 39 which rotatably engages the peripheral wall of the orifice 22.

A ring gasket 40 is mounted on the spindle 39 intermediate of the length thereof, and the bushing 41 encircles the spindle 39, and the bushing makes threaded engagement with the enlarged portion 23 of the orifice 22.

The outer end of the spindle 39 is squared and on this projecting squared end the hand lever 43 is attached. It will thus be seen that the carrier plate B is pivoted in the chamber 13 and may be swung in a clockwise or anti-clockwise direction to a limited extent through approximately 180°.

On the outer face of the member 10 I provide two stop pins 44 which are adjustably mounted on the member 10, and the projecting ends of these pins may be formed with eccentrically shaped heads 45 with which the hand lever 43 co-acts to limit the swinging action of the lever 43 to approximately 180°, and by adjustment of these stop pins the swing of the lever 43 is controlled to accurately centre the carrier plate, so that the orifice plate holders 36 will register with the flow pipe line when the lever 43 is moved by an operator.

The orifice plate holders 36 are annular in shape and snugly fit between the arcuate arms 34 and 35 and are frictionally embraced thereby, and these holders are each formed at one end with an inwardly extending radial flange 46.

The upper and lower faces of the plate holders 36 are provided with ring gaskets 47 and 48, and the radial flange is provided on its inner face with a ring gasket 49. The orifice plates 50 fit within the holders 36 and are retained within the holders by rings 51.

Referring now to FIGURE 9, it will be seen that the access plate 15 is formed with a cylindrical body portion 52 provided intermediate of its length with a ring gasket 53, and the outer end of the access plate is constructed as a flange 54.

This access plate 15 is formed with an axial orifice 55 which forms an observation orifice, to see if the orifice plate 50 is properly in registering position when installed on the plate carrier B.

The cylindrical body 52 of the access plate 15 engages the peripheral wall of the orifice 14 in the member 10, with the ring gasket 53 in intimate contact with the said peripheral wall.

The access plate 33 is formed with a cylindrical body portion 56 provided intermediate of its length with a ring gasket 57, and the outer end of this access plate is constructed as a flange 58. The cylindrical body portion 56 fits the orifice 32 in the member 11 and the gasket 57 intimately engages the peripheral wall of this orifice.

When the device is assembled, with the two members 10 and 11 of the housing firmly bolted together, then the flanges 21 and 31 may be secured to flanges on the pipe line and secured to such flanges by bolts.

The lever 43 which controls the rotary movement of the carrier plate B is rotated so that one orifice plate holder 36 centrally registers with the orifices 18 and 28, and in this position the second holder 36 mounted in the carrier plate B will centrally register with the orifices 32 and 14.

Since the holder 36 in registering position with the orifices 18 and 28 is not visible to the operator in this position, then the operator of this device will inspect the position of the holder 36 in the orifices 14 and 32 by looking through the inspection orifice 55, and if the orifice in the plate 50 registers with the orifice 55 in the access plate, then the operator will know that the orifice plate 50 in the holder 36 which is positioned between the orifices 18 and 28 in the members 10 and 11 will be in a proper registering position with respect to these last said orifices.

It will be seen that the orifice 59 in the plate 50 is centrally positioned in this plate. When the orifice plate 50 which is in commission between the orifices 18 and 28 in the members 10 and 11 becomes fouled, or if for other reasons it should be necessary to remove this orifice plate, then the operator simply rocks the lever 43 through approximately 180° to bring the other orifice plate into registering position between the orifices 18 and 28.

The fouled orifice plate 50 will now be positioned between the access plates 15 and 33 which are then removed to permit the annular holder 36 of the orifice plate being disengaged from the carrier plate B and extracted through the orifice 32.

A new orifice plate 50 is now inserted in the holder 36 which is replaced in the carrier plate B. During this change of orifice plates the pipe line has remained in full operation.

The conduits 26 are connected to a meter (not shown) which indicates the differential of pressure on the upstream and downstream sides of the flow line. A valve casing C is mounted on the outer face of the member 10 and a valve 60 is provided in the valve casing C, so that when the valve is open the meter will be in communication with the upstream and downstream sides of the flow line. When the valve is closed the meter does not function to show this differential of pressure.

It is not thought necessary to enlarge on the description of the meter and/or its function as this would only result in prolixity.

It is thought advisable to repeat the principal features of this invention as follows:

(a) This invention enables an operator to position an orifice plate in a flow line without shutting down or impairing the efficiency of the flow line.

(b) It enables the operator to quickly change one plate to an alternative plate if and when desired.

(c) It enables the operator to load the carrier with new plates and to inspect the centering of these plates without shutting off the flow line or impairing its efficiency.

(d) The arrangement of the several parts is such that the carrier may be operated by means of a motor and clutch assembly instead of manually.

Figure 1:
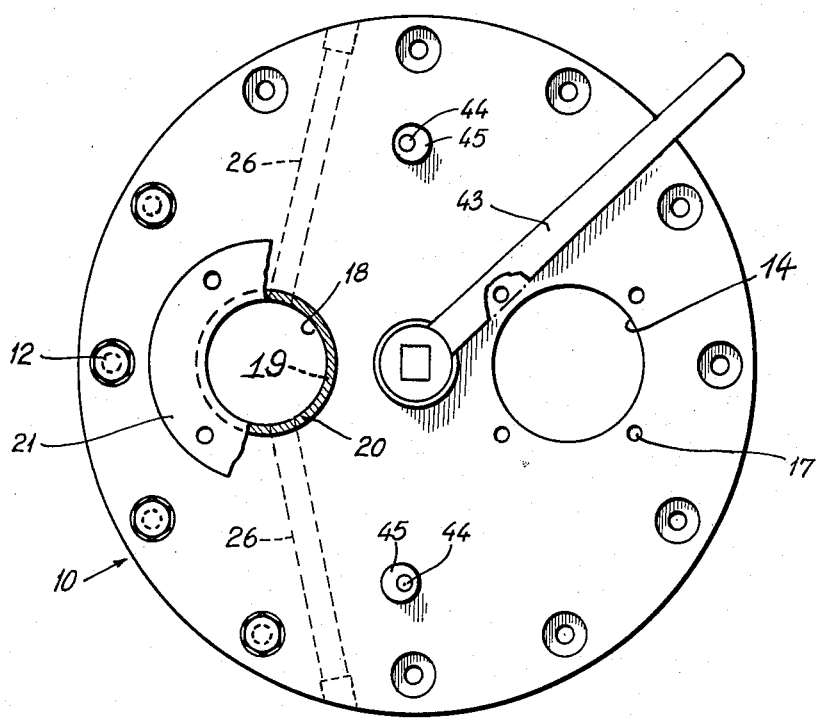
Figure 3:
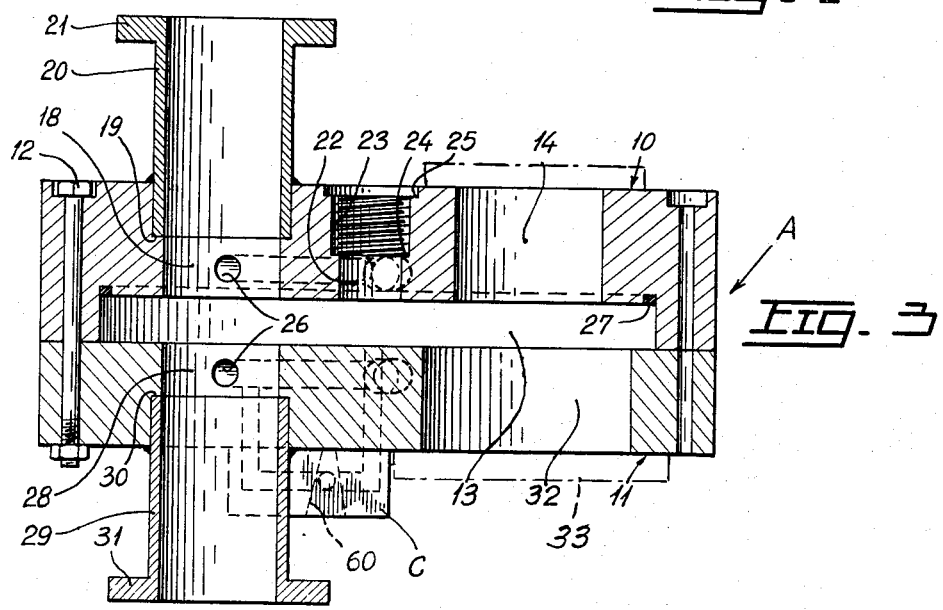
FIGURE 3 is a vertical section of the housing showing the compartment therein in which the carrier plate is pivotally mounted.
Figure 2:
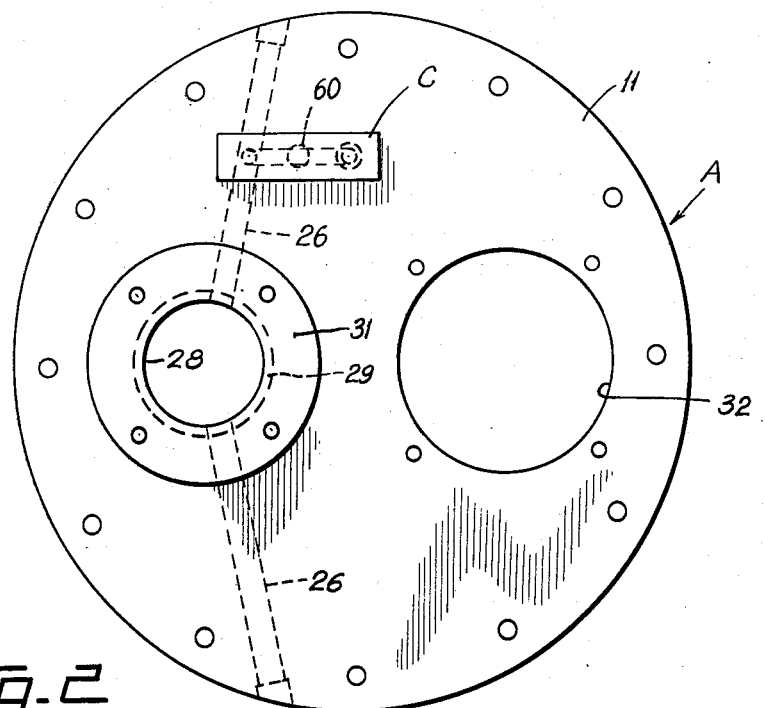
FIGURE 2 is an elevation of the other end of the housing with the flange of the discharge conduit cut away for clarity and showing the access plate on that end of the housing.
Figure 4:
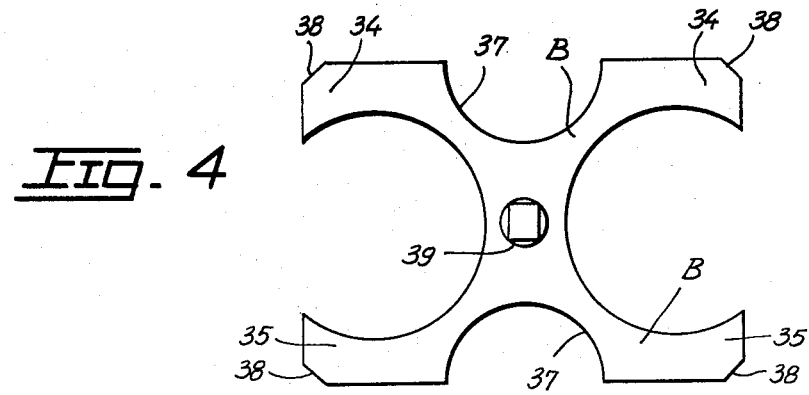
FIGURE 4 is a plan view of the carrier for the orifice plates.

(e) And finally, the orifice plate carrier shown in FIGURE 4 is constructed or fashioned of this particular shape, so that it will not block the flow line and/or build up excessive differential pressures when the carrier is rotated to change orifice plates.

From the above description it will be seen that I have invented an orifice plate quick change holder which may be advantageously used in flow pipe lines and in which inspection and removal and replacement of orifice plates can be made with despatch and without impairing the efficiency or requiring a stopping of the flow line during these operations.

I claim:

1. An orifice plate quick change holder comprising a housing formed of two similar members, a chamber centrally located in one member and lying wholly within the housing, one of the members being provided with a pair of spaced orifices located diametrically opposite each other, the other member being provided with a pair of orifices aligned with the orifices in the said member, conduits connected to two of the aligned orifices, the remaining two orifices being closed by covers, a rectangular carrier housed in the said chamber and formed at its ends with oppositely disposed arcuate arms, a spindle normally connected to the carrier and extending centrally through one of the said members, annular holders for orifice plates removably engaged with the arcuate arms of the carrier and provided with gaskets in their outer faces, the inner wall of each annular holder being provided with a radial flange carrying a gasket, an orifice plate located within each holder, and means for rotating the spindle through approximately a semi-circle to bring the orifice plates into registering position with the orifices in the two first said members.

2. An orifice plate quick change holder comprising a housing formed of two cylindrical members detachably secured to each other, a chamber centrally located in one member and lying wholly within the housing, one of the members being provided with a pair of spaced orifices located diametrically opposite each other, the other member being provided with a pair of orifices aligned with the orifices in the said member, conduits connected to two of the aligned orifices, the remaining orifices being closed by removable covers, a rectangular carrier housed in the said chamber and formed at its ends with oppositely disposed arcuate arms, a spindle normally connected to the carrier and extending through one of the said cylindrical members, annular holders removably engaged with the arcuate arms of the carrier and formed with gaskets in their outer faces, the inner wall of each annular holder being provided with a radial flange carrying a gasket, an orifice plate mounted within each annular holder, a ring insertable in each annular holder to co-act with the orifice plate located therein, a lever operatively connected with the spindle, and adjustable means on the housing with which the lever co-acts to limit the movement of the lever to an angle of approximately 180°.

3. The orifice plate quick change holder claimed in claim 2 in which one of the covers is provided with an orifice permitting inspection of the orifice plate underlying the said cover without removal of the cover.

References Cited in the file of this patent

UNITED STATES PATENTS

| | | |
|---|---|---|
| 1,633,161 | Cavenagh | June 21, 1927 |
| 1,860,417 | Hume | May 31, 1932 |
| 1,982,754 | Peterson | Dec. 4, 1934 |
| 2,219,504 | Willis | Oct. 29, 1940 |
| 2,514,431 | West | July 11, 1950 |
| 2,955,614 | Meynig | Oct. 11, 1960 |

FOREIGN PATENTS

| | | |
|---|---|---|
| 1,078,890 | France | May 12, 1954 |